United States Patent
Gautama

(10) Patent No.: US 10,936,070 B2
(45) Date of Patent: Mar. 2, 2021

(54) HAPTIC SIGNAL GENERATOR

(71) Applicant: GOODIX TECHNOLOGY (HK) COMPANY LIMITED, Hong Kong (HK)

(72) Inventor: Temujin Gautama, Boutersem (BE)

(73) Assignee: GOODIX TECHNOLOGY (HK) COMPANY LIMITED, Hong Kong (HK)

( * ) Notice: Subject to any disclaimer, the term of this patent is extended or adjusted under 35 U.S.C. 154(b) by 0 days.

(21) Appl. No.: 16/297,809

(22) Filed: Mar. 11, 2019

(65) Prior Publication Data

US 2019/0286235 A1    Sep. 19, 2019

(30) Foreign Application Priority Data

Mar. 16, 2018  (EP) ..................... 18162264

(51) Int. Cl.
```
B06B 1/10      (2006.01)
G06F 3/01      (2006.01)
B06B 1/02      (2006.01)
G10H 1/08      (2006.01)
G06F 3/16      (2006.01)
```
(52) U.S. Cl.
CPC ............ *G06F 3/016* (2013.01); *B06B 1/0207* (2013.01); *B06B 1/10* (2013.01); *G06F 3/167* (2013.01); *G10H 1/08* (2013.01)

(58) Field of Classification Search
CPC ...................................... G06F 3/016
USPC ............................................. 340/407.1
See application file for complete search history.

(56) References Cited

U.S. PATENT DOCUMENTS

| | | | |
|---|---|---|---|
| 6,143,974 A  *  | 11/2000 | Dahl | G10H 7/10 84/659 |
| 8,717,152 B2 | 5/2014 | Bhatia et al. | |
| 8,754,758 B1 | 6/2014 | Ullrich et al. | |
| 9,128,523 B2 | 9/2015 | Buuck et al. | |
| 9,368,005 B2 | 6/2016 | Cruz-Hernandez et al. | |
| 9,448,626 B2 | 9/2016 | Cruz-Hernandez et al. | |
| 9,519,346 B2 | 12/2016 | Lacroix et al. | |
| 2012/0206246 A1* | 8/2012 | Cruz-Hernandez | G06F 3/016 340/407.1 |
| 2013/0335209 A1* | 12/2013 | Cruz-Hernandez | G06F 3/016 340/407.1 |
| 2018/0005497 A1* | 1/2018 | Venkatesan, Sr. | G08B 6/00 |

FOREIGN PATENT DOCUMENTS

| | | | |
|---|---|---|---|
| EP | 2487557 A2 | 8/2012 | |
| EP | 2674835 A2 | 12/2013 | |
| WO | WO-2018/005590 A1 | 1/2018 | |

* cited by examiner

*Primary Examiner* — Qutbuddin Ghulamali

(57) ABSTRACT

A method and apparatus for generating a haptic signal is described. An audio signal is received and an event signal comprising a plurality of pulses is determined from a characteristic of the audio signal. A haptic output signal is generated by combining a haptic pattern triggered by a first pulse and at least one further substantially identical haptic pattern triggered by at least one further pulse.

12 Claims, 5 Drawing Sheets

(12)  United States Patent

HAPTIC SIGNAL GENERATOR

CROSS-REFERENCE TO RELATED APPLICATIONS

This application claims the priority under 35 U.S.C. § 119 of European patent application no. 18162264.8, filed Mar. 16, 2018 the contents of which are incorporated by reference herein.

OVERVIEW

This disclosure relates to haptic signal generation.

Currently, there exist several approaches to the generation of haptic effects to accompany audio. In many approaches, the haptic signal consists of a sine wave, the amplitude of which is modulated by the envelope of the audio signal, a frequency-shifted version of a frequency band of the audio signal, or pitch-shifted version of a frequency band of the audio signal. Another approach uses a library of audio events with pre-designed haptic effects, which outputs the pre-designed haptic effects when the audio events are detected in the audio signal. Alternatively, a library of haptic effects may be used with different characteristics, for example length or strength, which may be compared to the same characteristics computed for events that are detected in the audio, and the best matching haptic effect will be used.

SUMMARY

Various aspects of the disclosure are defined in the accompanying claims. In a first aspect there is provided a haptic signal generator comprising an event generator having an event generator input configured to receive an audio signal, and an event generator output configured to output an event signal comprising a plurality of pulses generated from a characteristic of the audio signal; an additive synthesizer having an input coupled to the event generator output and a haptic signal output; wherein the additive synthesizer is configured to output a haptic signal comprising the summation of a haptic pattern triggered by a first pulse and at least one further haptic pattern triggered by at least one further pulse.

In one or more embodiments, the haptic signal may only be generated when the audio signal is above a predetermined threshold.

In one or more embodiments, the characteristic of the audio signal may comprise at least one of the audio signal envelope, the signal envelope of the filtered audio signal and a measure of the change in signal envelope.

In one or more embodiments, the event generator may comprise an audio characteristic extractor coupled to a pulse calculator and is configured to generate an event signal by generating pulses dependent on a comparison between a determined characteristic of the audio signal and an estimated characteristic.

In one or more embodiments, the pulse calculator may further comprise a resynthesis module and a series arrangement of a comparator and a pulse generator, wherein the comparator comprises a first comparator input coupled to the audio characteristic extractor, a second comparator input coupled to a resynthesis module output, and wherein the resynthesis module input is coupled to the pulse generator output and the pulse generator output is coupled to the event generator output and the resynthesis module is configured to derive an estimated characteristic value by adding values of independent representations of the one or more haptic patterns generated at previous time events and wherein the pulse calculator is configured to generate a pulse if the estimated characteristic value is less than the determined characteristic of the audio signal.

In one or more embodiments, the independent representation of a haptic pattern may comprise a scaled first-order impulse response comprising an amplitude and a time constant.

In one or more embodiments, the time-delay between start times of at least some consecutive haptic patterns may be less than the time duration of the haptic pattern.

In one or more embodiments, the haptic signal generator may comprise a plurality of additive synthesizers, wherein the outputs of each of the plurality of additive synthesizers is coupled to an adder and wherein the output of the adder is coupled to the haptic signal output.

In one or more embodiments, the haptic signal generator may comprise a plurality of event generators having an input coupled to the audio input and a respective output coupled to a respective input of one of the additive synthesizers.

In one or more embodiments, the audio characteristic extractor may comprise a series arrangement of a filter and an envelope calculation module.

In one or more embodiments, the haptic pattern and the at least on further haptic pattern may be substantially identical.

In one or more embodiments, the haptic signal generator may be coupled to a series arrangement of a haptic driver and a haptic actuator. The haptic signal generator may be included in a mobile device.

In a second aspect there is provided a method for generating a haptic signal comprising receiving an audio signal; generating an event signal comprising a plurality of pulses determined from a characteristic of the audio signal; and generating a haptic output signal by combining a haptic pattern triggered by a first pulse and at least one further substantially identical haptic pattern triggered by at least one further pulse.

In one or more embodiments, the characteristic of the audio signal may comprise at least one of the audio envelope, the signal envelope of the filtered audio signal, and a measure of the change in signal envelope.

In one or more embodiments, the method may further comprise applying one of a low-pass filter, high-pass-filter and band-pass filter to the audio signal and generating the event signal from the filtered audio signal.

In one or more embodiments, generating the haptic output signal may comprise adding the haptic pattern and the at least one further haptic pattern. The haptic pattern and the at least one further haptic pattern may be substantially identical.

In one or more embodiments, the method may further comprise generating a haptic output signal comprising a combination of a first haptic pattern triggered by a first pulse, at least one further first haptic pattern triggered by a second pulse, a second haptic pattern triggered by a third pulse and at least one further second haptic pattern triggered by a fourth pulse.

In a third aspect there is described a computer program product comprising instructions which, when being executed by a processing unit, cause said processing unit to perform the steps of receiving an audio signal; generating an event signal comprising a plurality of pulses determined from a characteristic of the audio signal; and generating a haptic output signal by combining a haptic pattern triggered by a first pulse and at least one further substantially identical haptic pattern triggered by at least one further pulse.

BRIEF DESCRIPTION OF DRAWINGS

In the figures and description like reference numerals refer to like features. Embodiments of are now described in detail, by way of example only, illustrated by the accompanying drawings in which.

DESCRIPTION

Figure 1:
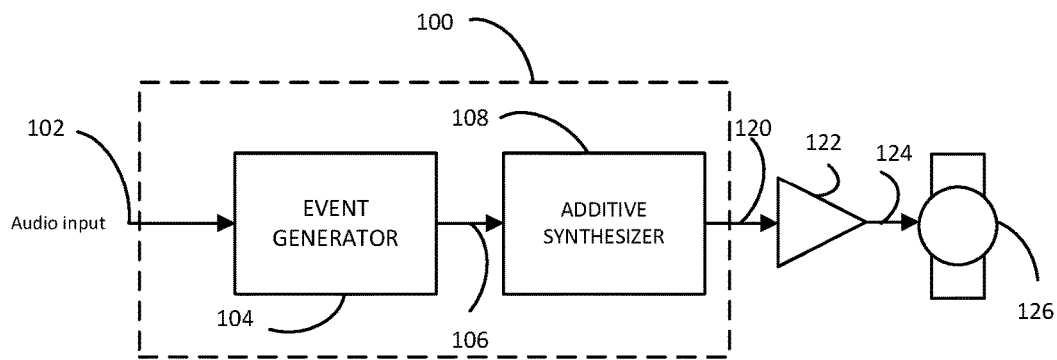
FIG. 1 shows a haptic signal generator according to an embodiment.

FIG. 1 shows a haptic signal generator 100 which includes an event generator 104 and an additive synthesizer 108. An audio input 102 is connected to the event generator 104. An output 106 of the event generator 104 is connected to the input of the additive synthesizer 108. The additive synthesizer output may be connected to the haptic signal generator output 120.

In operation the haptic signal generator output 120 may be connected to a haptic driver 122. The haptic driver output 124 may be connected to a haptic actuator 126 such as a linear resonant actuator or piezo-electric transducer.

The event generator 104 may determine an audio characteristic of the audio signal. This may be for example the envelope of the audio signal, a filtered version of the envelope, or a measure of the change in signal envelope over time, for example the temporal derivative of a signal envelope. Alternatively, or in addition, the audio characteristic may include one or more of a longer-term power estimate, the tonal balance and the crest factor. The crest factor may be determined from the ratio between the peak value of the audio signal and its average (RMS) value. The event generator may generate an event signal including a train or sequence of events or pulses from the audio characteristic. In one example this generation may be done by pulse density modulation of the audio characteristic. An event or pulse in this context may be understood as a hardware pulse or an event that may be generated in software or hardware at a certain time instant. The additive synthesizer 108 may receive the sequence of pulses and generate a substantially identical haptic pattern triggered by each pulse. The haptic pattern may for example correspond to the haptic effect of a click, referred to as a haptic click, when the resulting haptic signal is used to drive a haptic actuator. The additive synthesizer 108 may add these haptic patterns together over time resulting in a haptic signal that, when sent to the haptic amplifier 122 and haptic actuator 124, generates a haptic signal that is closely related to the audio characteristics of the audio signal. The haptic signal may no longer resemble the single haptic click, because the spacing between the pulses, corresponding to the time delay between each haptic pattern generation, is typically smaller than the length of the haptic click i.e. the duration of a single haptic pattern. These overlapping or stacked haptic patterns may result in a haptic signal having improved correlation to the audio signal, By generating a haptic signal in this way, the haptic signal generator 100 may generate a haptic signal with a very natural sensation that accompanies and enhances the audio signal. Because the haptic signal is generated from additive synthesis of haptic patterns, a more complex haptic signal may be generated from a single haptic pattern compared with conventional haptic signal generation.

The haptic generator 100 may be implemented in hardware or a combination of hardware and software. In some examples the event generator 104, and the additive synthesizer 108 may be implemented in software running on a microprocessor or digital signal processor. Additional interface circuitry (not shown) may be used to couple the generated haptic signal to the haptic driver 122. In some examples, the event generator 104 may be implemented by software running on a first digital signal processor or microprocessor and the additive synthesizer 108 may be implemented by software running on a second digital signal processor or microprocessor. In some examples the haptic signal generator may include a dynamic range compressor (not shown) which may compress the haptic signal so that the haptic driver 122 or the haptic actuator 126 is not overdriven.

Examples of the haptic signal generator may be included in mobile devices such as mobile phones. Mobile devices may use haptic actuators to generate virtual clicks when for example the functionality of a hardware button is replaced with a virtual button on the screen. The haptic signal generator 100 may allow the same pattern used for generating virtual clicks to be used to generate more complex haptic effects which are correlated to an audio signal. It will be appreciated that in other examples, the haptic signal generator may also use other haptic patterns instead of the haptic pattern used to generate a haptic click, such as longer sine wave bursts or tapered sine wave bursts.

Figure 2:
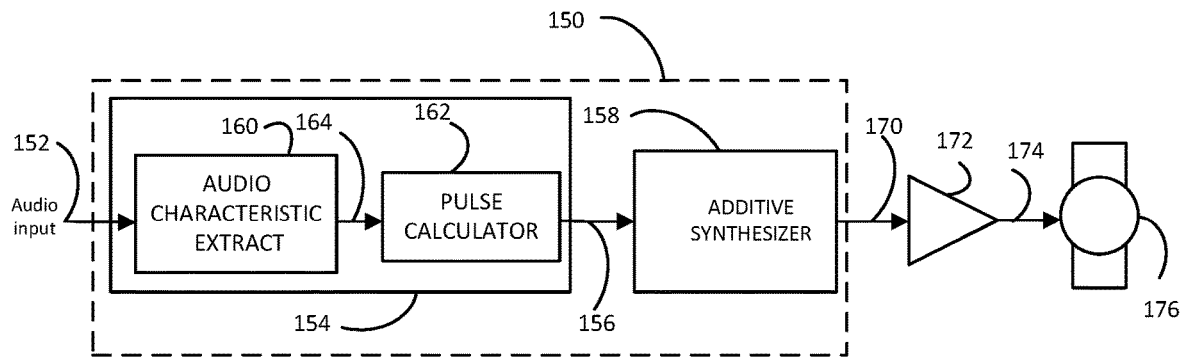
FIG. 2 illustrates a haptic signal generator according to an embodiment.

FIG. 2 shows a haptic signal generator 150 which includes an event generator 154 and an additive synthesizer 158. The event generator 154 may include an audio characteristic extractor 160 and a pulse calculator 162. An audio input 152 is connected to the audio characteristic extractor 160. An output 164 of the audio characteristic extractor may be connected to the pulse calculator 162. An output 156 of the pulse calculator 162 may be connected to the additive synthesizer 158. An output of the additive synthesizer 158 may be connected to the haptic signal generator output 170.

In operation the haptic signal generator output 170 may be connected to a haptic driver 172. The haptic driver output 174 may be connected to a haptic actuator 176 such as a linear resonant actuator or piezo-electric transducer.

The audio characteristic extractor 160 may determine an audio characteristic of the audio signal received on the audio input 152. This characteristic may be for example the envelope of the audio signal, a filtered version of the envelope, the frequency spectrum or some other characteristic. The audio characteristic extractor 160 may generate an audio characteristic signal.

The pulse calculator 162 may generate an event signal consisting of a train or a sequence of pulses derived from the audio characteristic signal. In one example the pulse calculator 162 may generate a sequence of pulses using pulse density modulation. A pulse in this context may be understood as a hardware pulse or an event that may be generated in software or hardware at a certain time instant. The additive synthesizer 148 may receive the sequence of pulses and generate an identical or substantially identical haptic pattern at each pulse. The haptic pattern generated triggered at each pulse may be identical or different. In some examples the haptic pattern may be substantially identical. In this context, substantially identical haptic patterns may refer to haptic patterns that may differ by a time delay and have a correlation coefficient of greater than 90%. The haptic pattern may for example correspond to the haptic effect of a click, referred to as a haptic click, when the resulting haptic signal is used to drive a haptic actuator. The additive synthesizer 158 may add these haptic patterns together resulting in a haptic signal that, when sent to the haptic amplifier 172 and haptic actuator 176, generates a haptic signal that is closely related to the audio signal characteristic. The haptic signal may no longer resemble the single haptic click, because the spacing between the pulses, corresponding to the time delay between each haptic pattern generation, is typically smaller than the length of the haptic click i.e. the duration of a single haptic pattern. These overlapping or stacked haptic patterns may result in a haptic signal having a more natural sensation and correlation to the audio signal than previous approaches.

By generating a haptic signal in this way, the haptic signal generator 150 may generate a haptic signal with a very natural sensation that accompanies and enhances the audio signal. Because the haptic signal is generated from additive synthesis of haptic patterns, a more complex haptic signal may be generated using a single haptic pattern compared with conventional approaches.

The haptic generator 150 may be implemented in hardware or a combination of hardware and software. In some examples the audio characteristic extractor 160, the pulse calculator 162, and the additive synthesizer 158 may be implemented in software running on a microprocessor or digital signal processor. Additional interface circuitry (not shown) may be used to couple the generated haptic signal to the haptic driver 172. In some examples, the audio characteristic extractor 160, the pulse calculator 162, and the additive synthesizer 158 may be implemented by software running on one or multiple microprocessors. In some examples the haptic signal generator may include a dynamic range compressor (not shown) which may limit the haptic signal so that the haptic driver 172 or the haptic actuator 176 is not overdriven.

Figure 3:
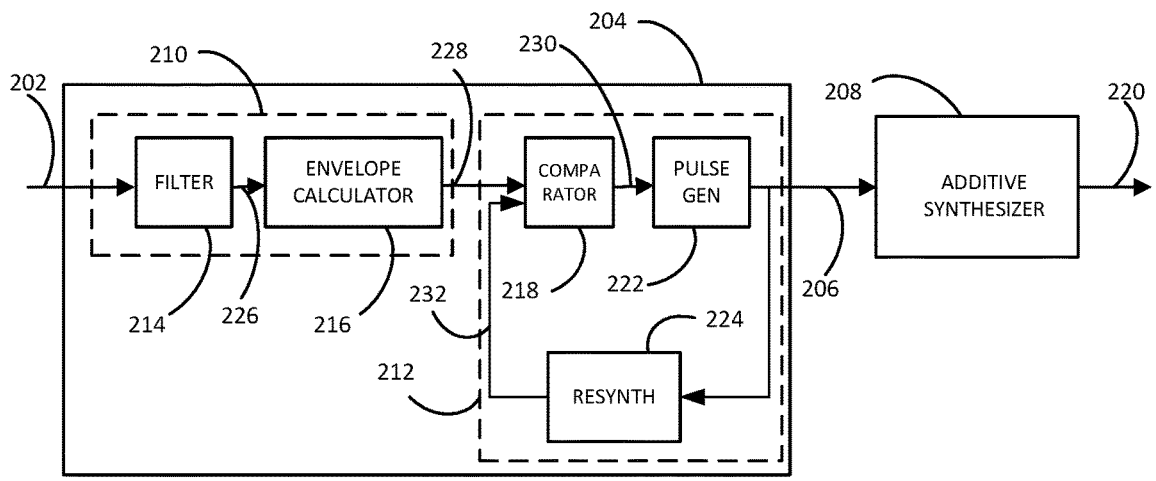
FIG. 3 shows a haptic signal generator according to an embodiment.

FIG. 3 shows a haptic signal generator 200 which includes an event generator 204 and an additive synthesizer 208. The event generator 204 may include an audio characteristic extractor 210 and a pulse calculator 212. The audio characteristic extractor 210 may include a filter 214, an envelope calculation module 216. The pulse calculator 212 may include a comparator 218, pulse generator 222 and re-synthesis module 224. In some examples the filter 214 may be omitted.

An audio input 202 is connected to the filter 214. A filter output 226 may be connected to the envelope calculation module 216. An envelope calculation module output 228 may be connected to a first input of the comparator 218. A comparator output 230 may be connected to the pulse generator 222.

An output 206 of the pulse generator 222 may be connected to the additive synthesizer 208. An output 206 of the pulse generator 222 may be connected to the re-synthesis module 224. A resynthesis module output 232 may be connected to a second input of the comparator 218. An output of the additive synthesizer 208 may be connected to the haptic signal generator output 220.

In operation the haptic signal generator output 220 may be connected to a haptic driver (not shown) which in turn may drive a haptic actuator (not shown).

An audio signal consisting of a sequence of audio sample values may be received on the audio input 202. The audio samples may be filtered by the audio filter 214. The audio filter 214 may be a low pass, high pass or band pass filter. The envelope calculation module 218 may determine the envelope of the filtered audio signal received from the filter 214. The envelope calculation module 216 may determine the envelope of the filtered audio signal for example by determining the smoothed absolute value of the audio samples with a particular time constant. In some example the time constant may be 50 ms. In other examples, the time constant may be between 10 ms and 100 ms. In examples where the filter 214 is omitted, the envelope calculation module 216 may determine the envelope of the full band audio signal.

The comparator 218 may compare the input power level of the envelope and only output a value if the input audio power level of the signal from the envelope calculation module 216 exceeds the value from the re-synthesised envelope signal output 232. In some examples, the comparator 218 may also apply a threshold and only output a signal if the output power from the envelope calculation module 216 exceeds a predetermined minimum threshold value. The re-synthesised envelope signal output 232 may be generated from the re-synthesis module 224 by additive synthesis of a responses of a first order system to a delta function, that is to say a first-order impulse response. The re-synthesis module 224 may allow the envelope to be resynthesized using abstract representations of haptic patterns on-the-fly with low complexity.

The inventor of the present disclosure has appreciated that such first-order responses may be interpreted as alternative independent representations of the effect of a haptic pattern in the same units or domain as the estimated envelope, for example voltage or current. The responses are unrelated to the haptic signal or pattern used by the additive synthesizer 208. The first-order impulse response may be parameterised independently of the haptic pattern for example by the amplitude and time constant.

The pulse generator 222 may output an event signal dependent on the comparison. The pulse calculator 212 may effectively generate a pulse coded representation of the audio signal envelope on-the-fly, where the position of the pulses are such that they reflect the audio characteristic: steep changes in the audio characteristic may yield closely spaced pulses, while a slower change in the audio characteristic may yield more sparsely spaced pulses, also when the span of the change in the audio characteristic is identical in both cases.

The additive synthesizer 208 may receive the sequence of pulses and generate haptic pattern at each pulse. The haptic patterns generated may be different or substantially identical. The haptic pattern may for example correspond to the haptic effect of a click, referred to as a haptic click, when the resulting haptic signal is used to drive a haptic actuator. The additive synthesizer 208 may add these generated haptic patterns together resulting in a haptic signal that generates a haptic signal which is closely related to the audio signal envelope. The haptic signal may no longer resemble the single haptic pattern, because the spacing between the pulses, corresponding to the time delay between each haptic pattern generation, may be smaller than the duration of a single haptic pattern. These overlapping or stacked haptic patterns may result in a haptic signal having a more natural sensation and correlation to the audio signal than previous approaches.

By generating a haptic signal in this way, the haptic signal generator 200 may generate a haptic signal with a very natural sensation that accompanies and enhances the audio signal. Because the haptic signal is generated from additive synthesis of haptic patterns, a more complex haptic signal may be generated using a single haptic pattern compared with conventional approaches.

The haptic generator 200 may be implemented in hardware or a combination of hardware and software.

Figure 4:
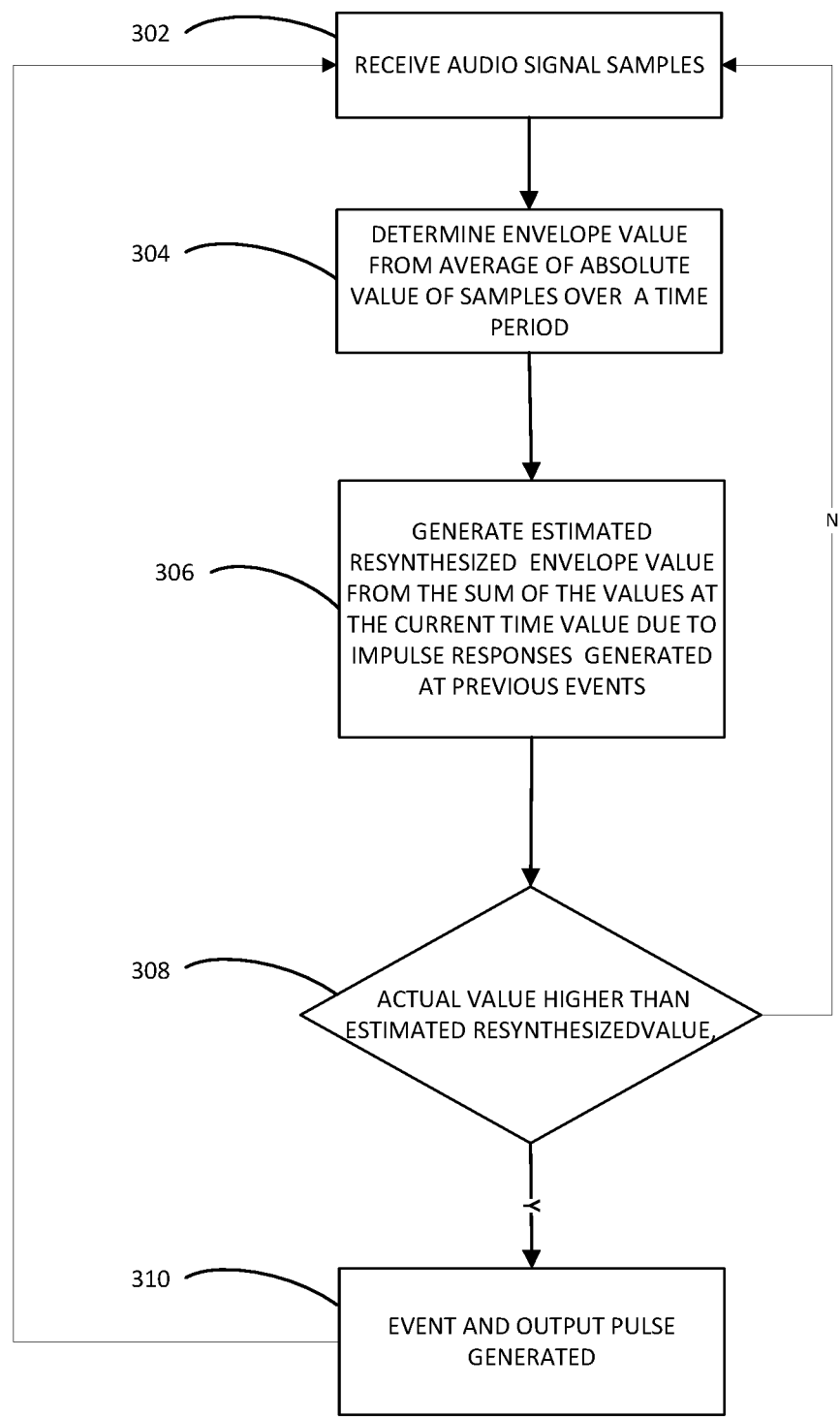
FIG. 4 illustrates a method for haptic signal generation according to an embodiment.

FIG. 4 shows an example of a method for haptic signal generation 300 using a haptic pattern for generating a virtual click which may be implemented in one or more examples of the event generator described in examples of the haptic signal generator.

In step 302 audio signal samples may be received. In step 304, an envelope value is determined from an average of audio signal samples over a predetermined time period or time constant. Steps 302, 304 may be implemented for example by the audio characteristic extractor in the haptic signal generators 150, 200.

The following steps may resynthesise an approximation of the envelope using abstract representations of the haptic pattern, such as a first-order impulse response. In step 306 estimated resynthesized envelope value may be determined from the sum of the values at the current time sample due to abstract representations of haptic patterns generated at previous events. At step 308 the estimated envelope value is compared to the resynthesized envelope value at that time sample. If the estimated envelope value determined in step 304 is less than or equal to than the resynthesized envelope value, the method returns to step 302 and the process is then repeated for subsequent audio samples. Returning to step 308, if the estimated envelope value determined in step 304 is higher than the resynthesized envelope value, an event is generated and a pulse corresponding to the generated event is output in step 310. An abstract representation of the haptic pattern is added to the resynthesized envelope (starting at the current sample and continuing in future time samples). The method returns to step 302 and the process is then repeated for subsequent audio samples. Steps 306, 308, 310 may be implemented by the pulse calculator in the haptic signal generators 150, 200. The method 300 allows the envelope to be resynthesized using abstract representations of haptic patterns on-the-fly with low complexity. The spacing of the clicks will be related to the steepness and height of the actual envelope. A steeper envelope may result in more closely spaced click. Consequently, the resulting event signal including the pulse train may have spacing inversely proportional to the envelope and its slope.

Figure 5A:
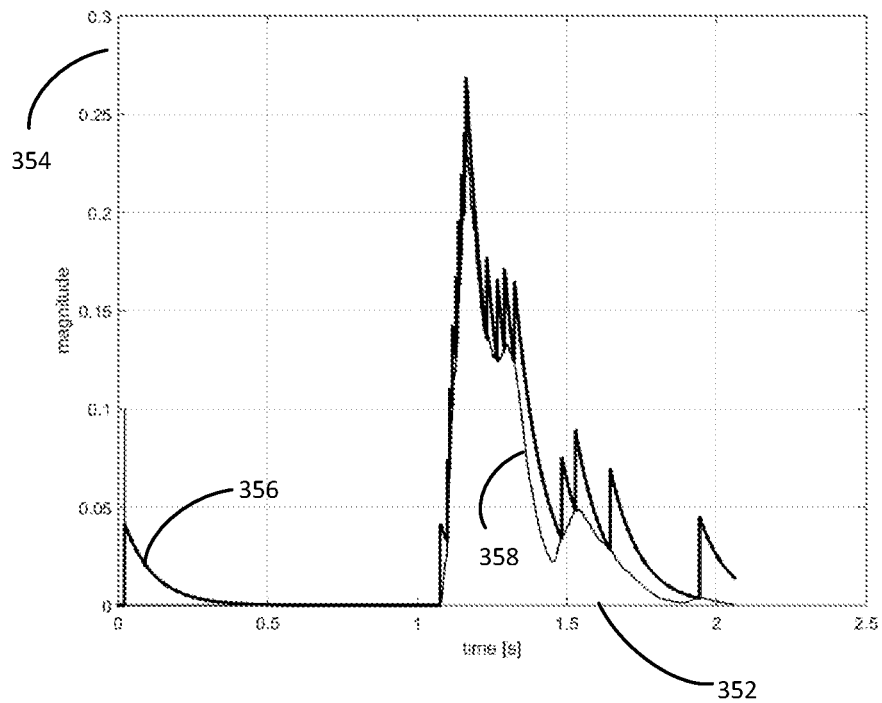
FIG. 5A illustrates a graph showing an example resynthesized envelope using the method described in FIG. 4.

FIG. 5A illustrates a graph 350 showing an example resynthesized envelope 356 using the method 300 described in FIG. 4 compared to the actual envelope 358. The x axis 352 shows time varying between 0 and 2.5 seconds. The y-axis 354 shows the envelope magnitude varying between 0 and 0.3 volts. The actual envelope is shown by the thin line 358 and the resynthesized envelope is shown be the thicker line 356. As explained previously in FIG. 4, for each time sample, the resynthesized envelope, which is obtained by summing the effect of the preceding first-order impulse responses shown be line 356, is compared to the actual envelope 358. If the resynthesized envelope 358 is below the actual envelope 356, a first-order impulse response is added, resulting in an approximation of the actual envelope.

Figure 5B:
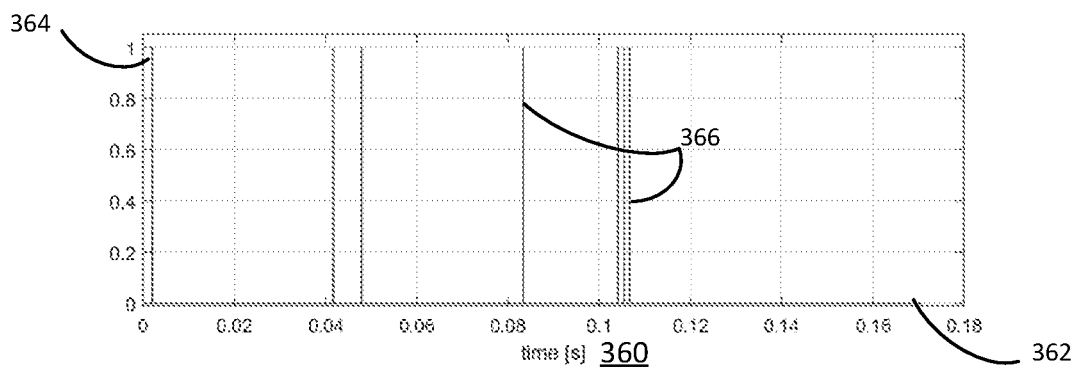
FIG. 5B shows an example pulse sequence generated according to an embodiment.

FIG. 5B shows an example pulse sequence generation 360 which is un-related to the envelope of FIG. 5A. The x-axis 362 shows time varying from 0 to 0.18 seconds, the y-axis 364 shows normalized pulse magnitude from 0 to 1. A number of generated pulses 366 are illustrated which may be determined as described previously for example by method 300.

Figure 5C:
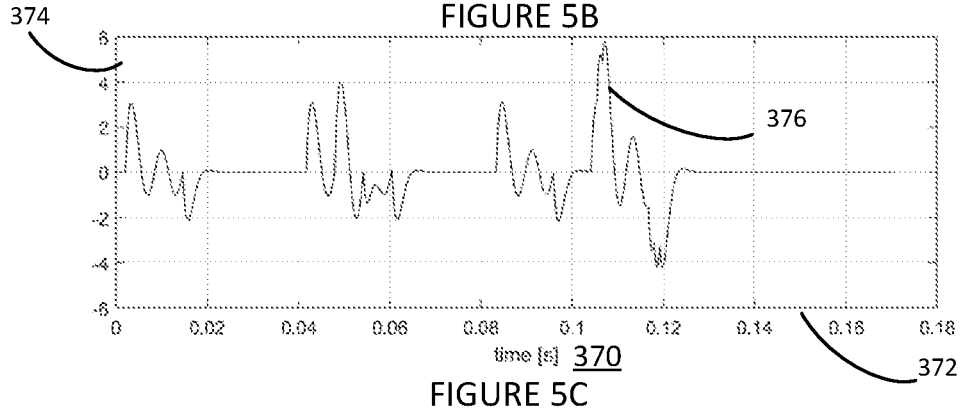
FIG. 5C shows an example haptic signal resulting from the example pulse sequence of 5B.

FIG. 5C shows a graph of the resulting output signal 370 resulting from additive synthesis of the haptic patterns generated which are triggered at each of the generated pulses 366. The x-axis 372 shows time varying from 0 to 0.18 seconds, the y-axis 374 shows the output signal magnitude varying between −6 volts to +6 volts. The haptic output signal is shown by line 376. The voltage signal for time t<0.03 s corresponds to a single haptic pattern. At the onset of a sharp increase in the signal envelope, many closely spaced pulses will occur resulting in multiple instances of the haptic patterns being generated which will build up a strong haptic sensation. The resulting haptic signal will typically no longer resemble the original haptic pattern. This can be observed in the haptic output signal line 376 at time t>0.1 s, which is the result of three overlapping haptic patterns. The resulting haptic signal is significantly different to the single haptic pattern which can be observed at time t<0.03 s. When the audio event reduces, the signal envelope decreases. This may result in fewer pulses being generated and so fewer haptic events will occur.

Figure 6:
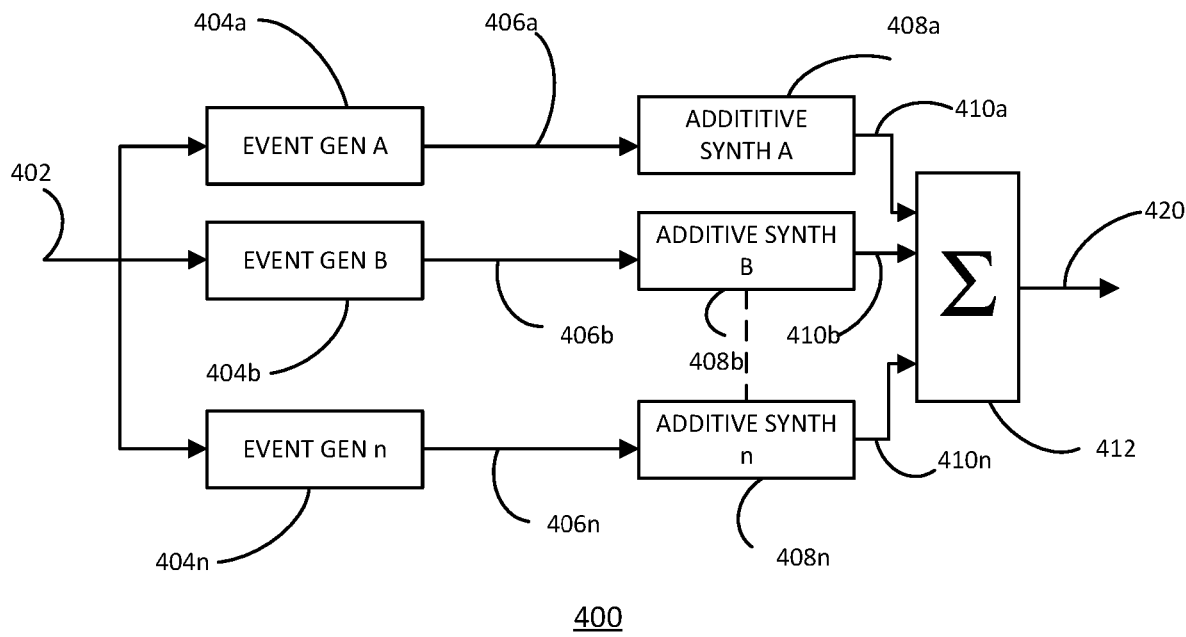
FIG. 6 shows a haptic signal generator according to an embodiment.

The envelope resynthesis which may be done by the event generator and the additive synthesizer of example haptic signal generators described may be done for multiple audio frequency bands with different parameters, for example below 1 kHz and above 8 kHz. This allows for a different haptic effect for sharp impacts, which may be for example frequencies above 8 kHz, than for explosive events, which may have lower frequencies for example between 100 Hz and 1 kHz. The different haptic signals can either be sent to different haptic actuators, or they can be summed and sent to a single haptic actuator. An example haptic signal generator 400 suitable for multiple audio bands is shown in FIG. 6.

Haptic signal generator 400 includes a number n of event generators 404a, 404b, 404n and a number of additive synthesisers 408a, 408b, 408n. Each of the event generators 404a, 404b, 404n has an input connected to an audio input 402. Each of the event generators 404a, 404b 404n has a respective output 406a, 406b, 406n connected to a respective additive synthesizer module 408a, 408b, 408n. The additive synthesizer module outputs 410a, 410b, 410n may be connected to a summing module 412. The output of the summing module 412 may be connected to the haptic signal generator output 420.

In operation the haptic signal generator output 420 may be connected to a haptic driver (not shown). The haptic driver output may be connected to a haptic actuator such as a linear resonant actuator or piezo-electric transducer (not shown).

An audio signal on audio signal input 402 may be received at the input of each of the event generators 404a, 404a, 404n.

Each of the event generators 404a, 404b, 404n may filter the audio signal in different frequency bands and determine an audio characteristic of the filtered audio signal. For example, event generator 404a may apply a low pass filter to the audio signal with a cut-off frequency of 1 KHz, event generator 404b may apply a bandpass filter between 2 and 8

KHz, and event generator 404n may apply a high pass filter with a cut-of frequency of 8 KHz. The audio characteristic may be for example the envelope of the respective filtered audio signal. Each event generator 404a, 404b, 404n may output an event signal including a train or sequence of pulses derived from the audio characteristic. In one example, this derivation may be done by pulse density modulation. In other examples this derivation may use the method 300 described in FIG. 3. A pulse in this context may be understood as a hardware pulse or an event that may be generated in software or hardware at a certain time instant.

Each of the additive synthesizers 408a, 408b, 408n may receive the event signal including the sequence of pulses and generate a haptic pattern at each pulse. The haptic patterns generated by each of the additive synthesizers 408a, 408b, 408n may be different. One of the haptic patterns may for example correspond to the haptic effect of a click, referred to as a haptic click, when the resulting haptic signal is used to drive a haptic actuator. Other haptic patterns may be used resulting in different haptic effects. Each additive synthesizer 408a, 408b, 408n may combine the respective generated haptic patterns on the outputs 410a, 410b, 410n. The summing module 412 may add these haptic patterns together resulting in a haptic signal on haptic signal output 420. These overlapping or stacked haptic patterns may result in a haptic signal having a more natural sensation and correlation to the audio signal than previous approaches.

As illustrated in FIG. 6, the haptic signal on haptic output 420 may be sent to a single haptic actuator. In other examples, the different haptic signals from the outputs 410a, 410b, 410n of each of the additive synthesizers 408a, 408b and 408n may be used to drive separate haptic actuators. In these examples, the summing module 412 may be omitted.

Figure 7:
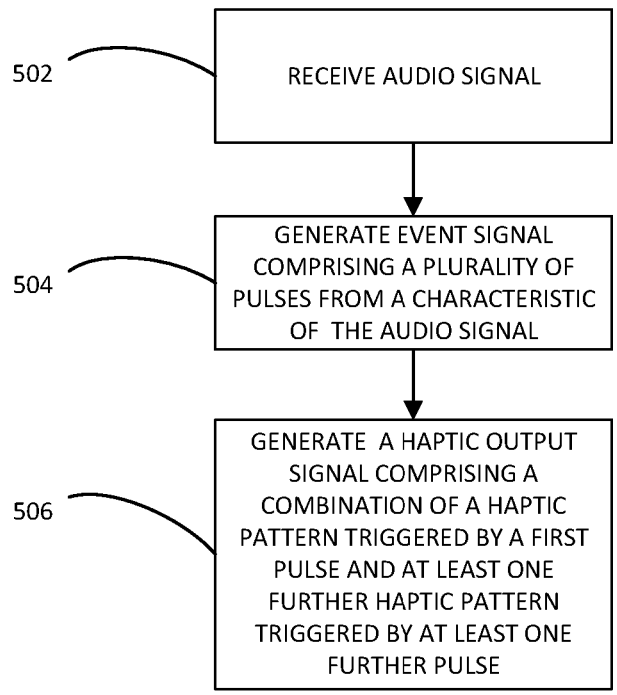
FIG. 7 illustrates a method for haptic signal generation according to an embodiment.

FIG. 7 shows a method of generating a haptic signal 500. In step 502 an audio signal may be received. In step 504 an event signal may be generated which includes a plurality, which is to say two or more pulses derived from a characteristic of the audio signal. The audio characteristic may be for example the envelope of the audio signal or the envelope of a filtered version of the audio signal, some aspect of the frequency spectrum, or some further characteristic. In step 506 a haptic output signal may be generated which includes a combination of a haptic pattern triggered by a first pulse and at least one further haptic pattern triggered by at least one further pulse. The haptic pattern which is generated at each pulse may be different or substantially identical to the previous pattern.

Figure 8:
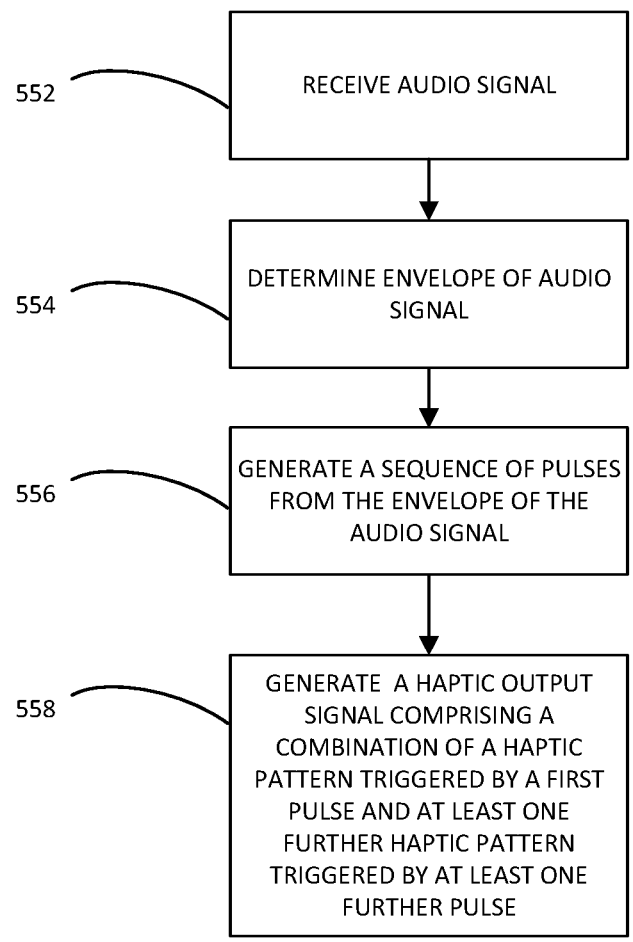
FIG. 8 illustrates a method for haptic signal generation according to an embodiment.

FIG. 8 shows a method of generating a haptic signal 550. In step 552 an audio signal may be received. In step 554 the envelope of the audio signal may be determined. In step 556, a sequence of pulses may be generated which are derived from the envelope of the audio signal. In step 558, a haptic output signal may be generated which comprises a combination of a haptic pattern triggered by a first pulse at least one further haptic pattern triggered by at least one further pulse. The haptic pattern and the at least one further haptic pattern may be different or substantially identical.

The haptic signal generators and method for generating a haptic signal described herein may generate a series of overlapping or stacked haptic pulses, which follow a characteristic of an audio signal such as the audio signal envelope. The resulting haptic signal does not use frequency-shifting or pitch-shifting which may be more complex. The user experience may be superior to that using an amplitude-modulated sine wave, because the haptic signal generated using the proposed invention is much richer in frequency content.

The envelope of the audio signal may be used to derive a train of pulses. At each pulse, a haptic pattern, which may for example correspond to a haptic click, may be generated. Where the haptic patterns are overlaid or stacked, the resulting haptic signal may no longer resemble a single haptic pattern because the spacing between the pulses is typically smaller than the length of the haptic click.

A method and apparatus for generating a haptic signal is described. An audio signal is received and an event signal comprising a plurality of pulses is determined from a characteristic of the audio signal. A haptic output signal is generated by combining a haptic pattern triggered by a first pulse and at least one further substantially identical haptic pattern triggered by at least one further pulse.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

LIST OF REFERENCE NUMBERS 100 haptic signal generator
102 audio input
104 event generator
106 event generator output
108 additive synthesizer
120 haptic signal generator output
122 haptic driver
124 haptic driver output
126 haptic actuator
150 haptic signal generator
152 audio input
154 event generator
156 pulse calculator output
158 additive synthesizer
160 audio characteristic extractor
162 pulse calculator
163 audio characteristic extractor output
170 haptic signal generator output
172 haptic driver
174 haptic driver output
176 haptic actuator
200 haptic signal generator
202 audio signal input
204 event generator
206 pulse generator output 208 additive synthesizer
210 audio characteristic extractor
212 pulse calculator
214 filter
216 envelope calculator
218 comparator
220 haptic signal generator output
222 pulse generator
224 resynthesis module
226 filter output
228 envelope calculation module output
230 comparator output
232 re-synthesised envelope signal output
300 method of haptic signal generation.
302 receive audio signal samples.
304 determine envelope value from average of absolute value of samples over a time period.
306 generate estimated resynthesized envelope value from the sum of the values at the current time value due to impulse responses generated at previous events.
308 actual value higher than estimated resynthesized value.
310 event and output pulse generated.
350 graph showing an example resynthesized envelope using the method 300
352 x-axis of graph 350
354 y-axis of graph 350
356 resynthesized envelope signal
358 envelope signal
360 example pulse sequence generation graph
362 example pulse sequence generation x-axis
364 example pulse sequence generation y-axis
366 generated pulses
370 graph of haptic output signal
372 x-axis of graph 370
374 y-axis of graph 370
376 haptic output signal line
400 haptic signal generator
402 audio input
404a event generator a
404b event generator b
404n nth event generator
406a event generator output a
406b event generator output b
406n nth event generator output
408a additive synthesizer module a
408b additive synthesizer module b
408n nth additive synthesizer module
410a additive synthesizer module a output
410b additive synthesizer module b output
410n nth additive synthesizer module output
412 summing module
420 haptic signal generator output
500 method of generating a haptic signal
502 receive audio signal
504 generate event signal comprising a plurality of pulses from a characteristic of the audio signal
506 generate a haptic output signal comprising a combination of a haptic pattern triggered by a first pulse and at least one further haptic pattern triggered by at least one further pulse
550 method of generating a haptic signal
552 receive audio signal
554 determine envelope of audio signal.
556 generate a sequence of pulses from the envelope of the audio signal
558 generate a haptic output signal comprising a combination of a haptic pattern triggered by a first pulse and at least one further haptic pattern triggered by at least one further pulse

The invention claimed is:

1. A haptic signal generator comprising:
an event generator having an event generator input configured to receive an audio signal, and an event generator output configured to output an event signal comprising a plurality of pulses generated from a characteristic of the audio signal;
an additive synthesizer having an input coupled to the event generator output and the additive synthesizer further having a haptic signal output;
wherein the additive synthesizer is configured to receive the plurality of pulses through the input and generate haptic pattern at each pulse and configured to output a haptic signal through the haptic signal output, wherein the haptic signal comprises the summation of a haptic pattern triggered by a first pulse and at least one further haptic pattern triggered by at least one further pulse;
wherein the event generator comprises an audio characteristic extractor coupled to a pulse calculator and is configured to generate an event signal by generating pulses dependent on a comparison between a determined characteristic of the audio signal and an estimated characteristic; and
wherein the pulse calculator further comprises a resynthesis module and a series arrangement of a comparator and a pulse generator, wherein the comparator comprises a first comparator input coupled to the audio characteristic extractor, a second comparator input coupled to a resynthesis module output, and wherein the resynthesis module input is coupled to the pulse generator output and the pulse generator output is coupled to the event generator output, and the resynthesis module is configured to derive an estimated characteristic value by adding values of independent representations of the one or more haptic patterns generated at previous time events, and wherein the pulse calculator is configured to generate a pulse if the estimated characteristic value is less than the determined characteristic of the audio signal.

2. The haptic signal generator of claim 1 wherein the haptic signal is only generated when the audio signal is above a predetermined threshold.

3. The haptic signal generator of claim 1 wherein the characteristic of the audio signal comprises at least one of the audio signal envelope, the signal envelope of the filtered audio signal, and a measure of the change in signal envelope.

4. The haptic signal generator of claim 1, wherein the independent representation of a haptic pattern comprises a scaled first-order impulse response comprising an amplitude and a time constant.

5. The haptic signal generator of claim 1 wherein the time-delay between start times of at least some consecutive haptic patterns is less than the time duration of the haptic pattern.

6. The haptic signal generator of claim 5 further comprising a plurality of event generators having an input coupled to the audio input and a respective output coupled to a respective input of one of the additive synthesizers.

7. The haptic signal generator of claim 1 comprising a plurality of additive synthesizers, wherein the outputs of each of the plurality of additive synthesizers is coupled to an adder and wherein the output of the adder is coupled to the haptic signal output.

8. The haptic pattern signal generator of claim 1 wherein the audio characteristic extractor comprises a series arrangement of a filter and an envelope calculation module.

9. The haptic pattern signal generator of claim 1 wherein the haptic pattern and the at least on further haptic pattern are substantially identical.

10. A method for generating a haptic signal comprising:
receiving an audio signal;
generating an event signal comprising a plurality of pulses determined from a characteristic of the audio signal;
generating haptic pattern at each pulse and output a haptic signal, wherein the haptic signal comprises the summation of a haptic pattern triggered by a first pulse and at least one further haptic pattern triggered by at least one further pulse;
wherein the generating an event signal comprises generating the event signal by generating pulses dependent on a comparison between a determined characteristic of the audio signal and an estimated characteristic and derive the estimated characteristic value by adding values of independent representations of the one or more haptic patterns generated at previous time events, and wherein the pulse calculator is configured to generate a pulse if the estimated characteristic value is less than the determined characteristic of the audio signal.

11. The method of claim 10 wherein the characteristic of the audio signal comprises at least one of the audio envelope, the signal envelope of the filtered audio signal, and a measure of the change in signal envelope.

12. The method of any of claim 10 wherein generating the haptic output signal comprises adding the haptic pattern and the at least one further haptic pattern, wherein the haptic pattern and the at least one further haptic pattern are substantially identical.

* * * * *